No. 872,024. PATENTED NOV. 26, 1907.
S. SMITH.
TUBE STOPPER.
APPLICATION FILED JULY 15, 1907.
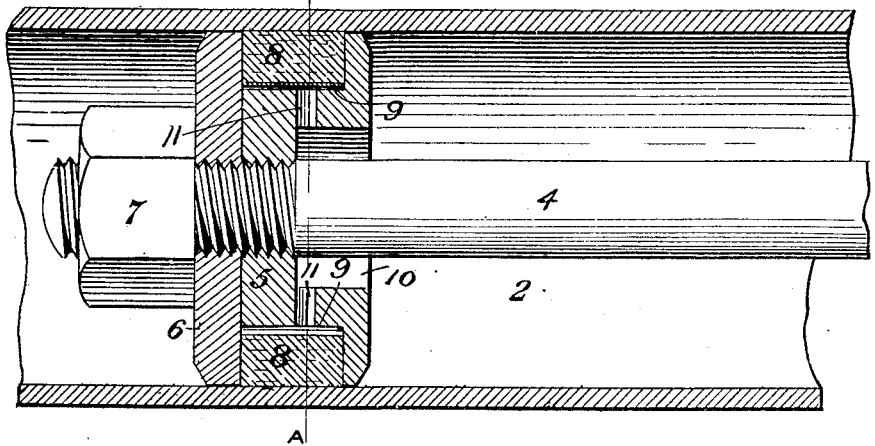
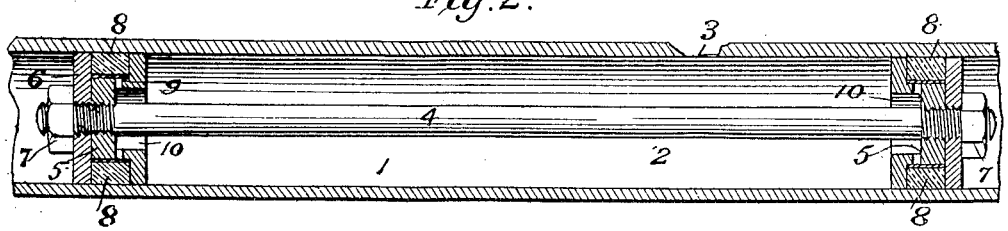
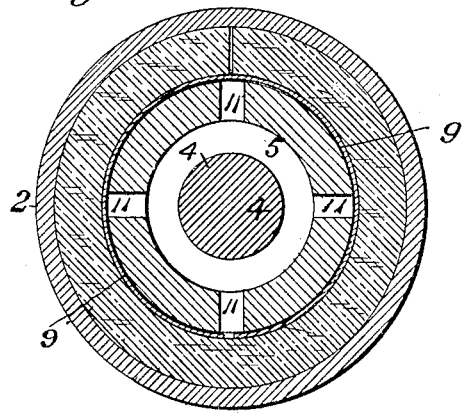
WITNESSES:
H. Woodard
Charles H. Wagner.
INVENTOR
Samuel Smith.
BY
Fred G. Dieterich
ATTORNEY

UNITED STATES PATENT OFFICE.

SAMUEL SMITH, OF SURREY CENTRE, BRITISH COLUMBIA, CANADA.

TUBE-STOPPER.

No. 872,024.      Specification of Letters Patent.      Patented Nov. 26, 1907.

Application filed July 15, 1907. Serial No. 383,816.

*To all whom it may concern:*

Be it known that I, SAMUEL SMITH, a citizen of the Dominion of Canada, residing at Surrey Centre, in the Province of British Columbia, Canada, have invented a new and useful Improvement in Tube-Stoppers, of which the following is a specification.

This invention relates to an improved boiler tube stopper designed to automatically expand and effect the closure of a defective boiler tube and is particularly designed to effect this purpose with more certainty and efficiency than those at present in use.

The invention is fully described in the following specification and illustrated in the drawings by which it is accompanied: Figure 1 being a longitudinal section through one of the heads of the stopper. Fig. 2, is a longitudinal section of a defective tube showing the application of the stopper to effect the closure of it. Fig. 3, is a cross section on the line A A of Fig. 1.

In these drawings 2 represents a boiler tube having a defect 3 the leakage through which it is desired to stop.

The stopper consists of two pistons of particular design to be described later and of a diameter adapted to the caliber of the tube in which it is intended to be used. These pistons are connected together by a rod 4 the object being to enable the appliance to be inserted in the defective tube and passed therein so that a piston shall be on each side of the defect.

Each piston consists of a head portion 5 and a follower 6 which are threaded upon a screwed end of the rod 4 and locked thereon by a nut 7. In the outer circumference of the head 5 is a recess which with the adjacent face of the follower 6 forms an annular groove in which is placed a ring 8 of some packing material such as the rubber and canvas commonly used for packing glands and on the inner side of this packing ring an open expanding ring 9 of thin metal may be used to close the joint of the packing ring 8 and facilitate its expansion when pressure is admitted to the inner side of it in the manner described. On the inner side of each head 5 that is, in the sides of them, which are adjacent when connected together by the rod 4 a recess 10 is formed extending toward the middle of the packing ring groove, which when the rod is in place will form an annular recess surrounding the rod, and from the packing ring groove a series of holes 11 are drilled into this recess 10 so that access is provided from the space between the two pistons to the inner side of or behind the packing ring to expand it outward to fill the tube in which it is inserted.

In use when the stopper is inserted into a defective tube 2 as soon as the first entered piston has been pushed past the defect 3, and the second head is entered into the tube, the steam or water escaping from the leak will accumulate between the two heads and its pressure, passing through the holes 11 from the annular recess to the packing ring groove, will act upon the inner sides of the packing rings and will expand these rings to tightly fill and close the tube on each side of the defect 3.

I provide the annular recess 10 to facilitate the drilling of the holes 11 connecting with the packing groove and to preclude the possibility of flue dust or scale closing these connecting apertures as it would be liable to do if the holes were drilled from two directions connecting with one another. This constitutes an important feature of the invention to which I largely attribute its success.

Having now particularly described my invention and the manner of its use, I hereby declare that what I claim as new and desire to be protected in by Letters Patent, is:

1. As a tube stopper, two pistons connected together a certain distance apart each piston comprising, a head having a circumferential recess on its outer face and an annular recess on its opposite or inner face and extending under the circumferential recess, apertures connecting the inner and outer recesses, a ring of packing in the outer recess, and a follower secured to the outer face of the head to retain such packing in place.

2. As a tube stopper, two pistons connected together a distance apart each piston comprising, a piston head having a circumferential recess on its outer face and an annular recess on its opposite or inner face the latter recess extending under the circumferential recess, apertures connecting the inner and outer recesses, a thin metal open ring fitting in the circumferential recess over the aforementioned apertures, a ring of packing outside of the metal ring in the recess the joint of which is approximately opposite to that of the metal ring, and a follower secured to the head to retain such packing in place.

3. As a tube stopper, a plurality of pistons connected together at intervals apart, each piston comprising a head having a circumferential recess 9 on its outer face, and an annular recess 10 on its inner face, said circumferential recess 9 extending over the annular recess 10, and having a series of radial apertures 11 communicating between the recesses 9 and 10, a follower disk 6 held adjacent the head and a ring 8 of packing material held in the outer recess 9, substantially as shown and described.

In testimony whereof I have signed my name to this specification in the presence of two subscribing witnesses.

SAMUEL SMITH.

Witnesses:
O. A. MARTINSON
H. A. CADWELL.